(12) United States Patent
Ishii et al.

(10) Patent No.: US 10,654,382 B2
(45) Date of Patent: May 19, 2020

(54) STRUCTURE OF WADDED-UP SEAT TRIM COVER AND METHOD OF MANUFACTURING WADDED-UP SEAT TRIM COVER

(71) Applicant: TACHI-S CO., LTD., Akishima-shi, Tokyo (JP)

(72) Inventors: Atsushi Ishii, Ome (JP); Shinichi Mizuno, Ome (JP)

(73) Assignee: TACHI-S CO., LTD., Tokyo (JP)

( * ) Notice: Subject to any disclaimer, the term of this patent is extended or adjusted under 35 U.S.C. 154(b) by 337 days.

(21) Appl. No.: 15/515,439

(22) PCT Filed: May 11, 2015

(86) PCT No.: PCT/JP2015/063472
§ 371 (c)(1),
(2) Date: Mar. 29, 2017

(87) PCT Pub. No.: WO2016/051843
PCT Pub. Date: Apr. 7, 2016

(65) Prior Publication Data
US 2017/0210261 A1 Jul. 27, 2017

(30) Foreign Application Priority Data
Sep. 29, 2014 (JP) .................. 2014-199158

(51) Int. Cl.
*B60N 2/58* (2006.01)
*B68G 7/05* (2006.01)

(52) U.S. Cl.
CPC ............. *B60N 2/5816* (2013.01); *B60N 2/58* (2013.01); *B68G 7/05* (2013.01)

(58) Field of Classification Search
CPC ...... B60N 2/58; B60N 2/5816; B60N 2/5883; B68G 7/05
See application file for complete search history.

(56) References Cited

U.S. PATENT DOCUMENTS

| 3,940,812 A | * | 3/1976 | DiForti | ..................... A43B 9/00 |
| | | | | 112/418 |
| 4,579,388 A | * | 4/1986 | Urai | ........................ B60N 2/58 |
| | | | | 297/452.26 |

(Continued)

FOREIGN PATENT DOCUMENTS

| JP | H0394200 Y | 9/1991 |
| JP | 2007289284 A | 11/2007 |

(Continued)

OTHER PUBLICATIONS

International Search Report pertaining to PCT/JP2015/063472, dated Jul. 21, 2015, with English translation.

*Primary Examiner* — James M Ference
(74) *Attorney, Agent, or Firm* — Cantor Colburn LLP

(57) ABSTRACT

A structure of wadded-up seat trim cover, having a plurality of trim cover pieces sewn together at one end, each composed of a wadding member and a skin member, includes a bonded portion formed by bonding the skin member to the wadding member made shorter than the skin member, at a position remote, by a prescribed distance, from the end of the wadding member overlapping the skin member; a first sewn portion formed by bending that portion of the skin member, not overlapping the wadding member, along the end of the wadding member and then by sewing the portions of the adjacent skin members together; and second sewn portions formed by bending each end of the adjacent skin member to the back of the trim cover piece at the first sewn portion and then by sewing the adjacent skin members together at overlapping portions.

4 Claims, 5 Drawing Sheets

(56) References Cited

U.S. PATENT DOCUMENTS

| | | | | |
|---|---|---|---|---|
| 4,699,427 A * | 10/1987 | Kobayashi | B29D 99/0092 | 297/452.27 |
| 4,747,638 A * | 5/1988 | Saito | B60N 2/58 | 297/452.35 |
| 4,867,508 A * | 9/1989 | Urai | B29D 99/0092 | 297/452.62 |
| 4,995,926 A * | 2/1991 | Urai | A47C 7/18 | 156/155 |
| 5,016,941 A * | 5/1991 | Yokota | B60N 2/5875 | 297/452.61 |
| 5,017,413 A * | 5/1991 | Moschini | A47C 21/026 | 112/405 |
| 5,395,473 A * | 3/1995 | Nixon | B29C 63/22 | 156/285 |
| 5,501,165 A * | 3/1996 | Nagashima | B60N 2/5891 | 112/132 |
| 5,607,201 A * | 3/1997 | Irie | A47C 7/24 | 297/452.62 |
| 5,669,670 A * | 9/1997 | Haraguchi | B29C 44/141 | 297/219.1 |
| 6,116,175 A * | 9/2000 | Ito | A41D 27/24 | 112/475.06 |
| 6,177,155 B1 * | 1/2001 | Kurosaki | B60R 13/02 | 112/440 |
| 6,505,570 B1 * | 1/2003 | Sakamoto | B29C 44/146 | 112/470.27 |
| 6,588,838 B1 * | 7/2003 | Dick, Jr. | B60N 2/5825 | 297/216.13 |
| 6,886,479 B1 * | 5/2005 | Hori | B60N 2/5883 | 112/470.27 |
| 7,401,829 B2 * | 7/2008 | Michalski | B60R 13/02 | 112/418 |
| 7,690,318 B2 * | 4/2010 | Dooley | B29C 45/14 | 112/475.17 |
| 7,752,985 B2 * | 7/2010 | Morita | B60N 2/78 | 112/475.04 |
| 8,783,768 B2 * | 7/2014 | Severinski | B60N 2/5891 | 297/218.1 |
| 9,216,702 B1 * | 12/2015 | Mannor | B60R 13/0206 | |
| 2003/0098113 A1 * | 5/2003 | Takei | B29C 44/143 | 156/79 |
| 2004/0036329 A1 * | 2/2004 | Ashton | B60N 2/5825 | 297/220 |
| 2006/0113756 A1 * | 6/2006 | Tracht | B60N 2/5883 | 280/730.1 |
| 2006/0185568 A1 * | 8/2006 | Kuttner | B60R 21/2342 | 112/475.02 |
| 2007/0022931 A1 * | 2/2007 | Wieczorek | B60N 2/5883 | 112/475.06 |
| 2008/0093830 A1 * | 4/2008 | Takezawa | B60R 13/02 | 280/751 |
| 2009/0096198 A1 * | 4/2009 | Yoshikawa | B60N 2/42763 | 280/743.1 |
| 2009/0121530 A1 * | 5/2009 | Yasuda | B60N 2/5816 | 297/224 |
| 2010/0127487 A1 * | 5/2010 | Kamo | B60N 2/5883 | 280/743.1 |
| 2010/0176633 A1 * | 7/2010 | Brncick | B60N 2/5816 | 297/228.11 |
| 2011/0049948 A1 * | 3/2011 | Hobl | B60N 2/5825 | 297/218.2 |
| 2012/0187731 A1 * | 7/2012 | Guadagno | B60N 2/5833 | 297/218.2 |
| 2012/0306256 A1 * | 12/2012 | Okuyama | B60N 2/5825 | 297/452.6 |
| 2013/0099549 A1 * | 4/2013 | Tanaka | B60N 2/5825 | 297/452.38 |
| 2014/0062162 A1 * | 3/2014 | Tabata | B60N 2/5891 | 297/452.58 |
| 2014/0125108 A1 * | 5/2014 | Kurashita | B60N 2/7011 | 297/452.18 |
| 2016/0368405 A1 * | 12/2016 | Ishii | B60N 2/5891 | |
| 2017/0210261 A1 * | 7/2017 | Ishii | B60N 2/58 | |
| 2017/0361745 A1 * | 12/2017 | Ishii | B60N 2/58 | |
| 2018/0312087 A1 * | 11/2018 | Ishii | A47C 31/02 | |
| 2019/0031066 A1 * | 1/2019 | Hirano | B29C 44/129 | |

FOREIGN PATENT DOCUMENTS

| | | |
|---|---|---|
| JP | 2008148742 A | 7/2008 |
| JP | 2011084207 A | 4/2011 |
| JP | 2011092400 A | 5/2011 |

* cited by examiner

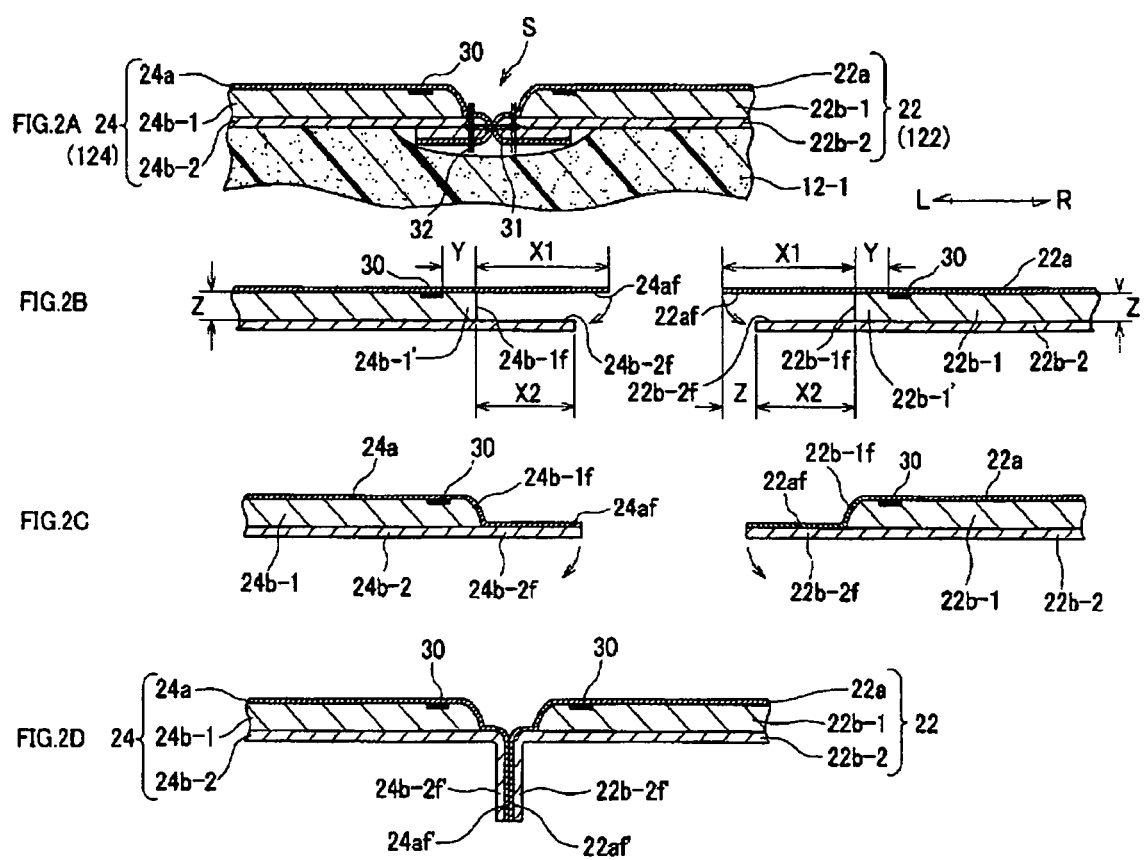

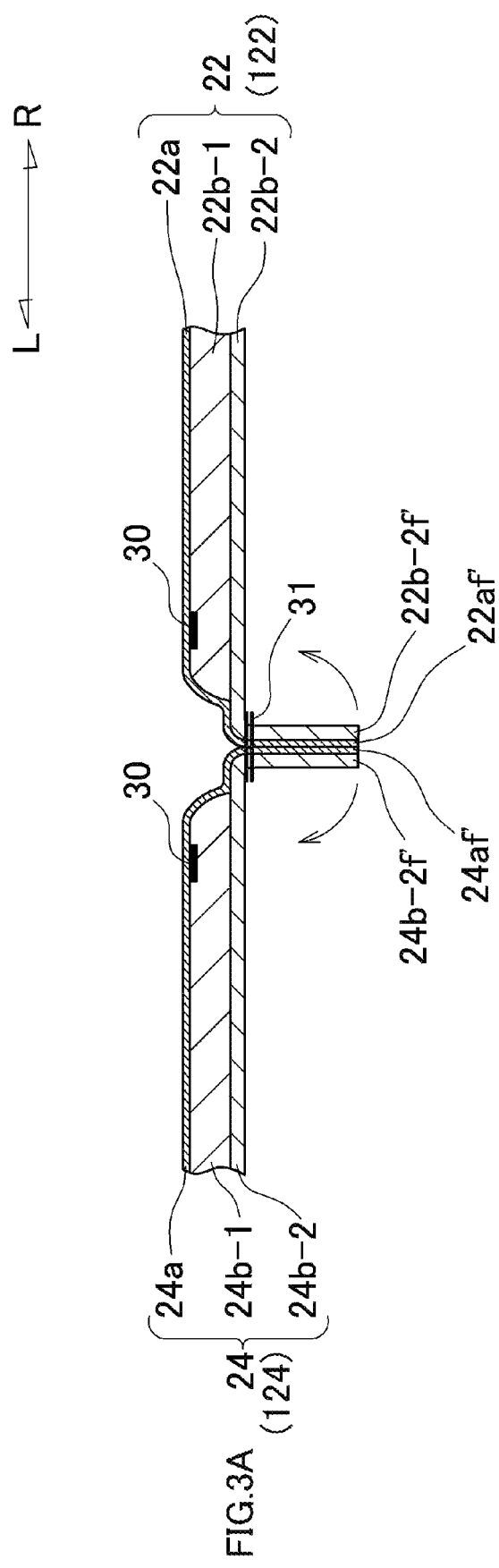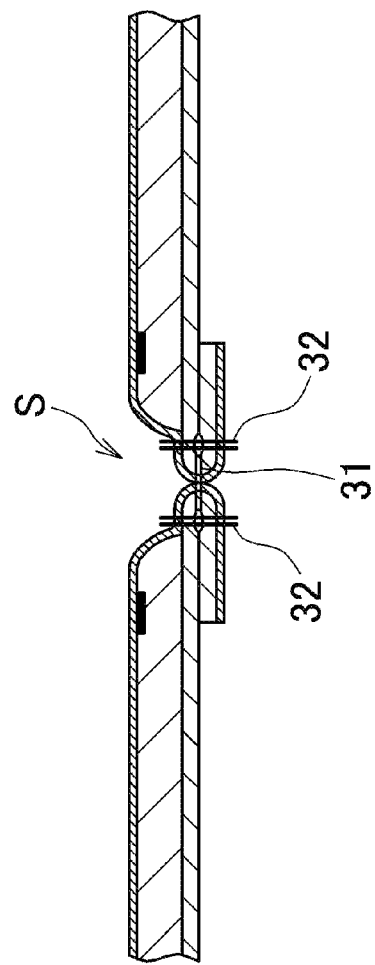

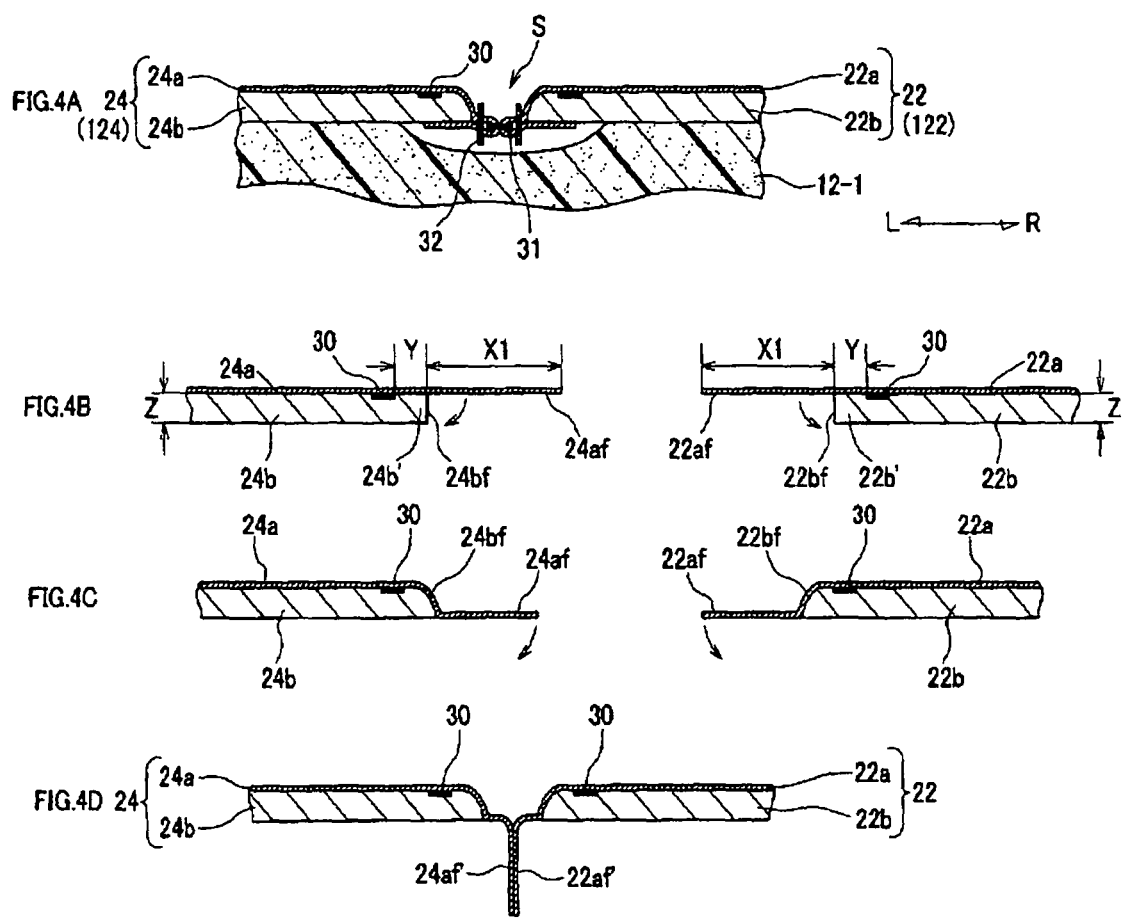

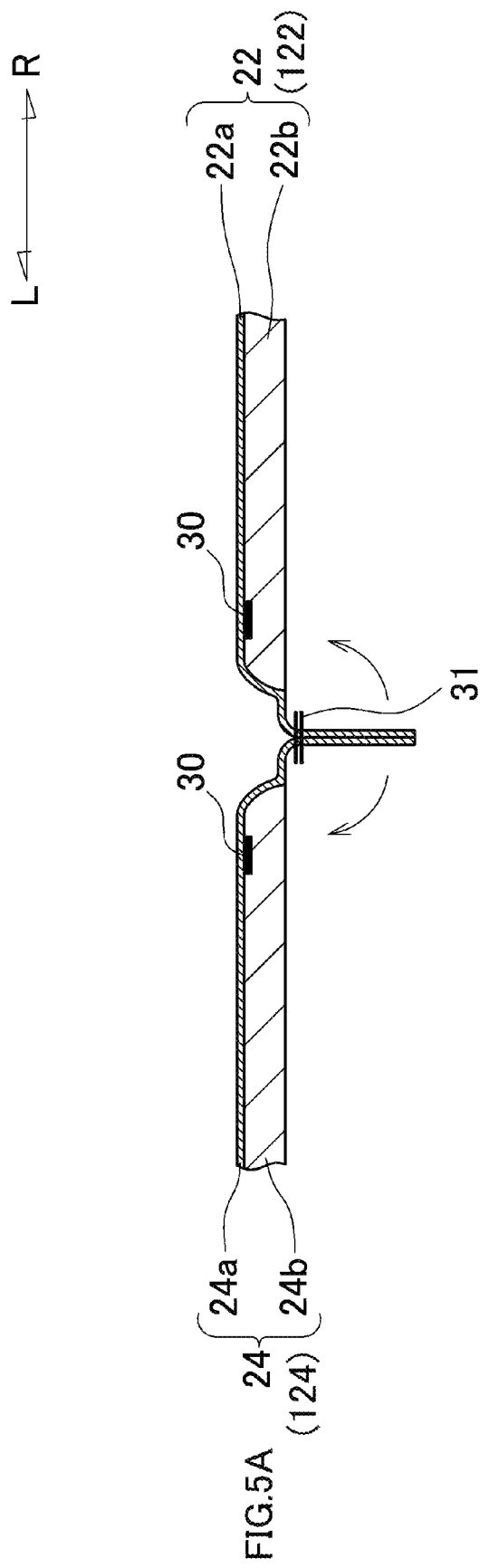
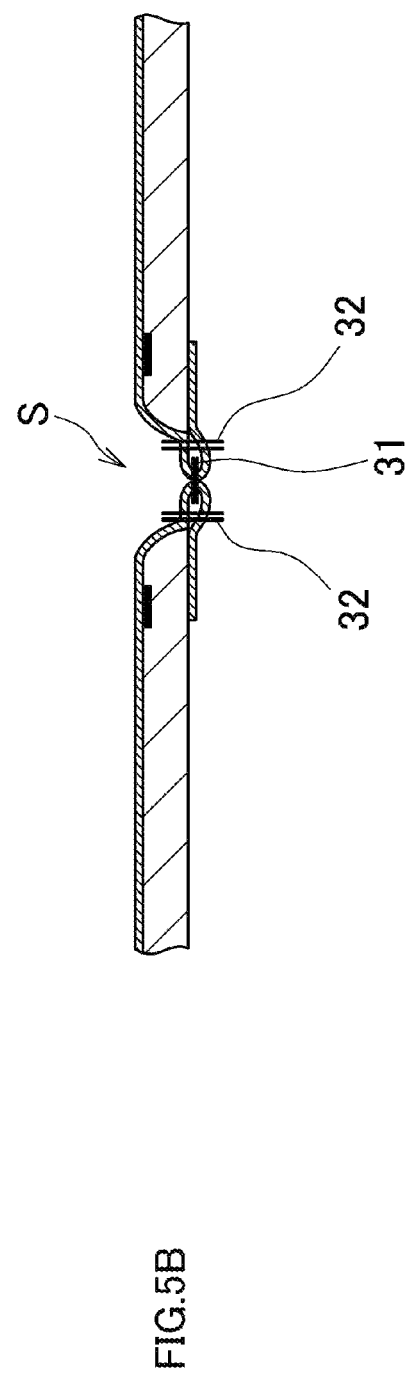
FIG.5A
FIG.5B

STRUCTURE OF WADDED-UP SEAT TRIM COVER AND METHOD OF MANUFACTURING WADDED-UP SEAT TRIM COVER

CROSS REFERENCE TO RELATED APPLICATIONS

This is the U.S. national stage of application No. PCT/JP2015/063472 dated May 11, 2015. Priority under 35 U.S.C. § 119(a) and 35 U.S.C. § 365(b) is claimed from Japanese Patent Application No. 2014-199158, filed Sep. 29, 2014, the entire contents of which are incorporated herein by reference.

BACKGROUND OF THE INVENTION

1. Field of the Invention

The present invention relates to a structure of wadded-up seat trim cover and a method of manufacturing wadded-up seat trim cover (a surface structure of wadded seat which includes a trim cover covering a seat pad, and also to a method of manufacturing wadded-up seat which includes a trim cover covering a seat pad) (a skin structure of sheet with wadding material and a manufacturing method of sheet with wadding material).

2. Description of the Related Art

A vehicle seat comprises a seat cushion and a seatback, each including a seat frame (a seat cushion frame or a seatback frame) which is a skeleton member, a seat pad (foam member) made of, for example, urethane foam, and a trim cover (surface member) which is composed of a plurality of trim cover pieces sewn together at one end and which is shaped like a bag. The seat pad is mounted on the seat frame, and the trim cover covers the seat pad. The vehicle seat is thereby provided.

Trim covers are known well, which excel in cushioning property or decorativeness and may therefore impart a luxurious feel to the vehicle seats. See, for example, Japanese Patent unexamined Publication JP2007-289284A and Japanese Utility Model unexamined Publication JP03-094200Y. For instance, a thin wadding member is laid on the back of a trim cover made of, for example, synthetic leather, enhancing the cushioning property of the trim cover. Further, two trim cover pieces may be sewed at abutting ends, single-stitched or double-stitched, thereby giving the trim cover decorativeness.

Japanese Patent unexamined Publication JP2007-289284A, for example, discloses a trim cover for the head rest or arm rest of a vehicle seat. The trim cover has trim cover pieces, each trim cover piece is composed of a skin member and a wadding member. The skin member and the wadding member are chain-stitched at one end, achieving edge linking and forming an integral component.

The sewn portions of the trim cover strips are made by sewing two trim cover strips overlapping each other, without sewing the bent-back portions that extend for a specific distance from the ends of the trim cover strip. The ends of the trim cover pieces are bent back to the back of the trim cover piece, can open to the left and right, respectively, around the sewn portions of the trim cover strips and are sewn at the bent-back portions.

This structure of the trim cover piece for the head rest or the like can be applied to the trim cover piece for the seat cushion or the seatback of the vehicle seat.

Japanese Utility Model unexamined Publication JP03-094200Y discloses a trim cover for the seat cushion of a vehicle seat. The trim cover piece of this trim cover is composed of a skin member, first and second core members, and a wadding member bonded to the entire surface of the skin member by means of lamination. The end of the trim cover is clamped between the two core members, and is sewn to the core members. The first core member is arranged above the end of the trim cover, and the second core member is arranged below the end of the trim cover. The first and second core members are sewn to the end of the trim cover, forming sewn portions. At the sewn portions, the trim cover piece is bent back, covering the first core member and the sewn portions.

Patent Literature 1: Japanese Patent unexamined Publication JP2007-289284A

Patent Literature 2: Japanese Utility Model unexamined Publication JP03-094200Y

In the structure disclosed in Japanese Patent unexamined Publication JP2007-289284A, the skin member and the wadding member are chain-stitched at end, achieving edge linking and forming an integral component. This improves the outer appearance of the trim cover. Further, the skin member and the wadding member form an integral component easily, not by bonding the wadding member to the entire surface of the skin member, but by sewing only. Since the skin member and the wadding member are chain-stitched at one end, the skin member shifts only a little from the wadding member even if the occupant moves on the seat cushion.

However, the stitches on the end of the trim cover piece are exposed at the upper surface of the bent-back portion of the trim cover piece. Inevitably, the stitches may therefore hitch or rub the occupant as he sits or moves on the vehicle seat. Consequently, the sewn portions may be unraveled or severed, impairing the outer appearance of the trim cover.

In the structure disclosed in Japanese Utility Model unexamined Publication JP03-094200Y, the trim cover piece is bent back, covering the sewn portion of the trim cover piece and first core member. The trim cover piece therefore conceal unraveling or severing of sewn portions, if any, at the end of the trim cover piece. Hence, the outer appearance of the trim cover would not be impaired.

However, since the trim cover piece conceals the sewn portions, the sewn portions cannot achieve any design improvement of the trim cover. Further, since two core members must be used, the trim cover piece is composed of more components than otherwise.

An object of this invention is to provide a structure of wadded-up seat trim cover, which is manufactured by sewing and has a better outer appearance without increasing the number of components and without unraveling or severing of the sewn portions.

Another object of this invention is to provide a method of manufacturing wadded-up seat trim cover, which can manufacture a trim cover having a better appearance by means of sewing without increasing the number of components and without unraveling or severing of the sewn portions.

SUMMARY OF THE INVENTION

In the present invention, the wadding member is shorter than the skin member. The wadding member is bonded to the skin member at a position remote from its end by a prescribed distance. Then, the skin member is bent along the end of the wadding member, forming two adjacent trim cover pieces. Two trim cover pieces are sewed together, providing a seat cover (i.e., trim cover).

More precisely, according to one aspect of the embodiment, a structure of wadded-up seat trim cover for covering a seat pad, having a plurality of trim cover pieces sewn together at each end of the trim cover piece composed of first and second wadding members and a skin member backed with the first and second wadding members, the structure includes bonded portions each being formed by bonding the skin member to the first wadding member made shorter than the second wadding member and the skin member and clamped between the skin member and the second wedding member at a secluded position, from an end of the first wadding member; a first sewn portion each being formed by first bending a portion of each skin member, which does not overlap the first wadding member, along an end of the wadding member, then overlapped by the skin member on the second wadding member; further bending the skin member together with the second wadding member downward, and finally sewing the skin member and the second wadding member together below the first wadding member; and a plurality of second sewn portions each being formed by bending back ends of the skin member and second wadding member to a back of the trim cover piece at the first sewn portion and then by sewing ends of the skin member and the second wadding member together at an overlapping portion that clamps the first sewn portion.

According to one aspect of the embodiment, a method of manufacturing a wadded-up seat trim cover for covering a seat pad, having a plurality of trim cover pieces sewn together at each end of the trim cover piece composed of first and second wadding members and a skin member backed with the first and second wadding members, the method includes a bonding step of bonding the skin member to the first wadding member made shorter than the second wadding member and the skin member and clamped between the skin member and the second wadding member, at a secluded position, from an end of the first wadding member, thereby forming a bonded portion; a first sewing step of bending a portion of each skin member, which does not overlap the first wadding member, along an end of the first wadding member to overlap on the second wadding member to a back of the trim cover piece at the first sewn portion and then to sew ends of the skin member and second wadding member together at an overlapping portion that clamps the first sewn portion, thereby forming second sewn portions.

In an embodiment of the invention, a groove having a depth corresponding to the sum of the thickness of the skin member and the thickness of the first wadding member is provided between the two trim covers pieces. The depth is approximately equal to the thickness of the wadding member. First and second sewn portions are located below the bottom of the groove, namely the upper surface of the skin member (i.e., trim cover piece), by a distance equivalent to the thickness of the wadding member. Therefore, the first and second sewn portions would not hitch or rub the occupant as he sits or moves on the vehicle seat, and the sewn portions would not be unraveled or severed. Further, the second sewn portion, which is seen from the upper surface of the trim cover (i.e., trim cover pieces) through the groove, imparts decorativeness and a good outer appearance to the trim cover.

Moreover, the wadded-up seat trim cover need not have core members, and the number of components does not increase.

In an embodiment of the invention, a groove is provided between two trim cover pieces in the first and second sewing steps only, and the first and second sewn portions are positioned on the bottom of the groove, which lies below the upper surface of the skin member (i.e., trim cover pieces) by the distance approximately equivalent to the thickness of the wadding member. Hence, a wadded-up seat trim cover can be manufactured in a simple method having a few steps, without using additional components such as core members. In the trim cover, the first and second sewn portions would not hitch or rub the occupant as he sits or move on the vehicle seat, and the sewn portions would not be unraveled or severed. The trim cover therefore has a good outer appearance.

Since no additional components such as core members are used, the number of components would not increase.

BRIEF DESCRIPTION OF THE DRAWINGS

FIG. 2A is a magnified sectional view taken along line 2A,4A-2A,4A shown in FIG. 1, showing the structure of wadded-up seat trim cover, according to the embodiment (Embodiment 1) of the present invention;

FIG. 2B to FIG. 2D are sectional views explaining the process of backing a skin member with first and second wadding members prior to the sewing process, and particularly FIG. 2B shows the portions to be bonded together;

FIG. 3A is a schematic view illustrating the first sewn portion in the structure of wadded-up seat trim cover, according to the embodiment (Embodiment 1) of the present invention;

FIG. 3B a schematic view illustrating the second sewn portions in the structure of wadded-up seat trim cover, according to the embodiment (Embodiment 1) of the present invention;

FIG. 4A is a magnified sectional view taken along line 2A,4A-2A,4A shown in FIG. 1, showing the seat skin (i.e., trim cover) of the structure of wadded-up seat trim cover, according to another embodiment (Embodiment 2) of the present invention;

FIG. 4B to FIG. 4D are sectional views explaining the process of backing a skin member with first and second wadding members prior to the sewing process, and particularly FIG. 4B shows the portions to be bonded together;

FIG. 5A is a schematic view illustrating the first sewn portion in the structure of wadded-up seat trim cover, according to the other embodiment (Embodiment 2) of the present invention; and FIG. 5B is a schematic view illustrating the second sewn portions in the structure of wadded-up seat trim cover, according to the other embodiment (Embodiment 2) of the present invention.

DETAILED DESCRIPTION OF THE INVENTION

Figure 1:
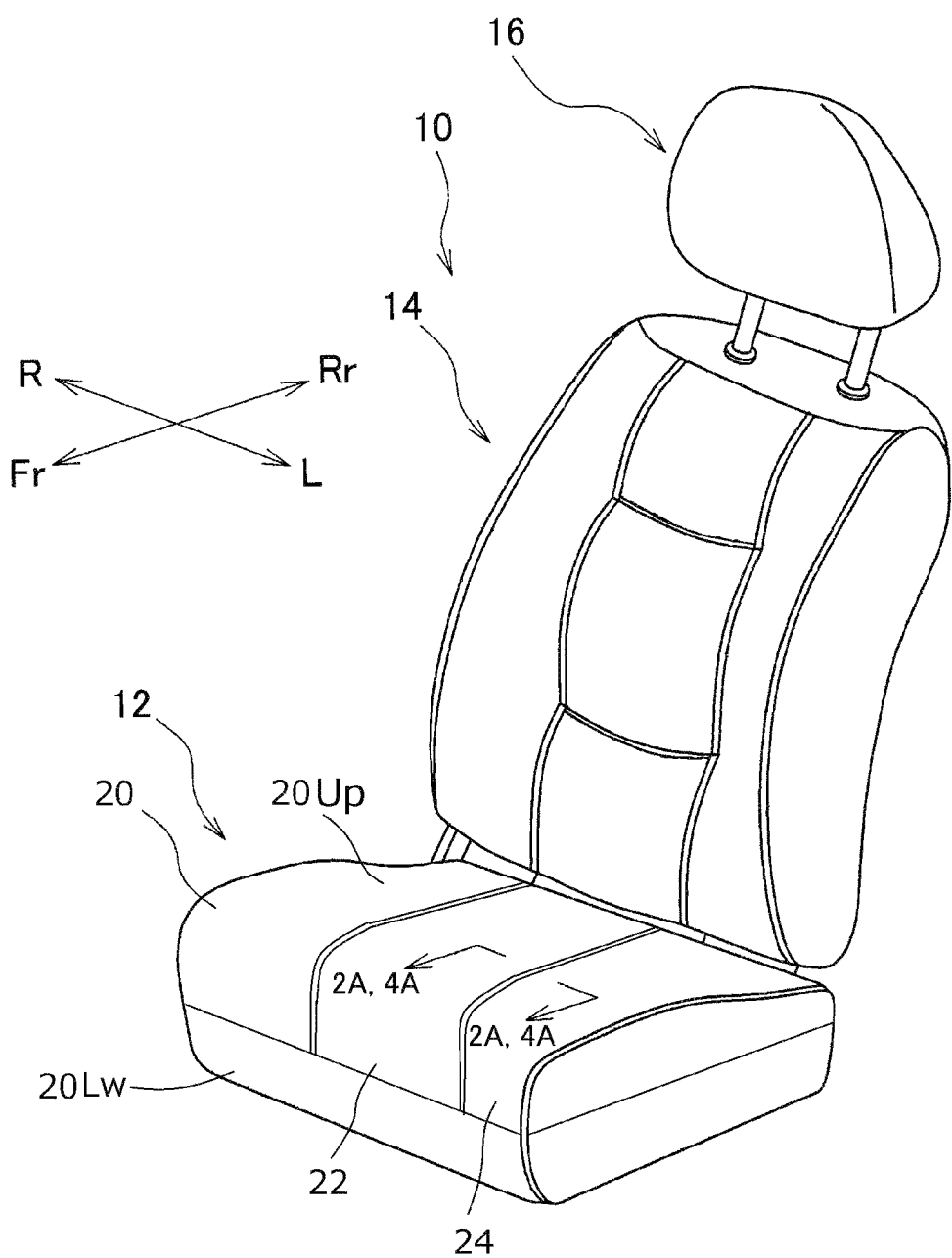
FIG. 1 is a perspective view of a vehicle seat having a structure of wadded-up seat trim cover, according to embodiments of the present invention.

A structure of wadded-up seat trim cover for covering a seat pad, having a plurality of trim cover pieces sewn together at one end, each composed of a wadding member and a skin member backed with the wadding member, the structure includes a bonded portion formed by bonding the skin member to the wadding member made shorter than the skin member, at a position remote, by a prescribed distance, from the end of the wadding member overlapping the skin member; a first sewn portion formed by bending that portion of the skin member, which does not overlap the wadding member, along the end of the wadding member and then by sewing the portions of the adjacent skin members together below the adjacent wadding members; and second sewn portions formed by bending each end of the adjacent skin member to the back of the trim cover piece at the first sewn portion and then by sewing the adjacent skin members together at overlapping portions that clamp the first sewn portion.

Embodiment

Embodiments of this invention will be described in detail, with reference to the accompanying drawings. FIG. 1 is a perspective view of a vehicle seat having a structure of wadded-up seat trim cover, according to embodiments of the present invention; FIG. 2A is a magnified sectional view taken along line 2A,4A-2A,4A shown in FIG. 1, showing the structure of wadded-up seat trim cover, according to the embodiment (Embodiment 1) of the present invention; FIG. 2B to FIG. 2D are sectional views explaining the process of backing a skin member with first and second wadding members prior to the sewing process, and particularly FIG. 2B shows the portions to be bonded together; FIG. 3A is a schematic view illustrating the first sewn portion in the structure of wadded-up seat trim cover, according to the embodiment (Embodiment 1) of the present invention and FIG. 3B a schematic view illustrating the second sewn portions in the structure of wadded-up seat trim cover, according to the embodiment (Embodiment 1) of the present invention.

In the drawings, arrows Fr and Rr indicate the forward and rearward directions, and arrows L and R indicate the leftward and rightward directions, with respect to the driver seated in the driver seat.

As shown in FIG. 1, the vehicle seat 10 comprises a seat cushion 12 and a seatback 14 provided at the rear end of the seat cushion 12. A headrest 16 is arranged on the top of the seatback 14.

The basic structures of the seat cushion 12 and seatback 14 are well known in the art. The seat cushion includes a seat cushion frame (not shown), a seat pad 12-1, and a trim cover 20. The seat cushion frame is shaped like letter U and composed of left and right side frames and a connecting pipe connecting the front ends of the side frames. The seat pad is made of foamed material such as urethane foam and is mounted on the seat cushion frame. The trim cover has air permeability and covers the seat pad. Similarly, the seatback 14 is formed by first mounting a seat pad on a seatback frame and then covering the seat pad with an air-permeable trim cover.

The trim cover 20 of the seat cushion is shaped, covering the seat pad 12-1, and is composed of two trim cover pieces sewn together at one end. The trim cover 20 is composed of, for example, an upper trim cover 20Up and a lower trim cover 20Lw. The upper trim cover has been made by sewing three trim cover pieces, i.e., left, center and right trim cover pieces.

At the intersection of the center trim cover piece 22 and left trim cover piece 24, for example, the center and left trim cover pieces are sewn at one end, forming a sewn portion.

How the center trim cover piece 22, one constituting member of the upper trim cover 20Up, is formed will be explained below. The left trim cover piece 24 sewn to the center trim cover piece 22 is formed in the same way as the center trim cover piece.

The center trim cover piece 22 is composed of a skin member 22a, a first wadding member 22b-1 and a second wadding member 22b-2, one laid on the back of another, from the upper surface (i.e., seat cushion surface) in the order mentioned.

The skin member 22a is made of, for example, synthetic leather. The first and second wadding members 22b-1 and 22b-2 are made of soft and elastic material such as polyurethane foam sheet.

As seen from not only from FIG. 2A, but also FIG. 2B, the first wadding member 22b-1 of the center trim cover piece is shorter than the skin member 22a and the second wadding member 22b-2. The first wadding member is interposed between the skin member and the second wadding member. In other words, the first wadding member 22b-1 is laid on the second wadding member 22b-2, and the skin member 22a is laid on the first wadding member 22b-1. The skin member 22a and the second wadding member 22b-2 are longer than the first wadding member 22b-1, and the portion 22af of the skin member and the portion 22b-2f of the second wadding member extend in widthwise direction (i.e., leftward), beyond the end 22b-1f of the first wadding member. Therefore, the portion 22af of the skin member and the portion 22b-2f of the second wadding member do not overlap the first wadding member.

The skin member 22a extends in the width direction (i.e., left-right direction) beyond the end 22b-1f of the first wadding member, by distance X1. Distance X1 is, for example, 30 to 40 mm.

The second wadding member 22b-2 extends beyond the end 22b-1f of the first wadding member, for distance X2. As seen from FIG. 2B, the second wadding member 22b-2 is shorter than the end of the skin member 22a by, for example, the thickness Z of the first wadding member.

At the position where the skin member 22a of the center trim cover piece 22 overlaps the first wadding member 22b-1, the first wadding member is bonded to the skin member at a prescribed distance (i.e., distance Y) from the end 22b-1f of the first wadding member, thereby forming a bonded portion 30. The bonded portion 30 is line-bonded, extending in the lengthwise direction (i.e., front-rear direction) of the seat cushion. The distance Y is, for example, 10 to 20 mm.

The portion 22af of the skin member, which does not overlap the first wadding member, is bent along the end 22b-1f of the first wadding member, in the direction of an arrow shown in FIG. 2B. As a result, the portion 22af overlaps the portion 22b-2f of the second wadding member. More specifically, as shown in FIG. 2C, the portion 22af of the skin member contacts the end 22b-1f of the first wadding member, presses the same downwards, is bent from the bonded portion 30 along the end of the first wadding member, and overlaps the portion 22b-2f of the second wadding member.

Those portions of the skin member and second wadding member, which are remote by a prescribed distance from their ends and which overlap each other, are bent downward in the direction of an arrow shown in FIG. 2C, forming bent-back portions 22af' and 22b-2f' as seen from FIG. 2D.

Like the center trim cover piece 22, the left trim cover piece 24 is composed of a skin member 24a, a first wadding member 24b-1 and a second wadding member 24b-2. The skin member 24a of the left trim cover piece is bonded to the first wadding member 24b-1 of the left trim cover piece, thereby forming a bonded portion 30. The portion 24af of the skin member, which does not overlap the first wadding member, is bent along the end 24b-1f of the first wadding member. Then, the portion 24*af* of the skin member is laid on the portion 24*b*-2*f* of the second wadding member, which does not overlap the first wadding member (see FIG. 2B and FIG. 2C). Those portions of the skin member and second wadding member, which are remote by a prescribed distance from their ends, are formed bent-back portions 24*af'* and 24-2*f'*. Then, the skin member and the second wadding member, overlapping each other, are bent downward in the direction of the arrow shown in FIG. 2C (see FIG. 2D). Each reference letter 22*b*-1' and 24*b*-1' in FIG. 2B means a wadding member overlapping the skin member 22*a* and 24*a*.

The skin member 22*a* and the second wadding member 24*b*-2 of the center trim cover piece and the skin member 24*a* and the second wadding member 24*b*-2 of the left trim cover piece, all adjacent to one another, are sewn together below the second wadding member, forming first sewn portion 31 (see FIG. 3A). More specifically, the first sewn portion 31 is formed by placing the center trim cover piece 22 and the left trim cover piece 24 adjacent to each other and by sewing the skin member 22*a* of the center trim cover piece, the skin member 24*a* of the left trim cover piece, the second wadding member 22*b*-2 of the center trim cover piece and the second wadding member 24*b*-2 of the left trim cover piece, which are bend downwards, below the second wadding member.

Next, the ends of the center trim cover piece 22 (more precisely, the bent-back portion 22*af'* of the skin member and the bent-back portion 22*b*-2*f'* of the second wadding member), and the ends of the left trim cover piece 24 (more precisely, the bent-back portion 24*af'* of the skin member and the bent-back portion 24*b*-2*f'* of the second wadding member), are bend back to the back of each trim cover at the first sewn portion 31. Then, the first sewn portion 31 is clamped at the ends of the trim cover pieces 22 and 24 so bend back. Further, the skin member 22*a* and the second wadding members 22*b*-2 of the center trim cover piece are sewn together, forming one second sewn portion 32, and the skin member 24*a* and the second wadding members 24*b*-2 of the left trim cover piece are sewn together, forming another second sewn portion 32 (see FIG. 3B).

The center trim cover piece 22 and the left trim cover piece 24 are sewn together at one end, forming the first sewn portion 31. The skin member and the second wadding member of the center or left trim cover piece are sewn together at bent-back end, forming the second sewn portion 32. Needless to say, two sewn portions 31 and 32 are formed, by the same method, also at the center and right trim cover pieces.

For example, the trim cover piece 24 may be replaced by a center trim cover piece 124, and the trim cover piece 22 may be replaced by a right trim cover piece 122, in the structures FIG. 2A and FIG. 3A. Further, the right trim cover piece 122 and the center trim cover piece 124 may be sewn in the same way as the trim cover pieces 22 and 24. Then, the center trim cover piece 124 and the right trim cover piece 122 are sewn at end, forming a first sewn portion 31. The skin member and the second wadding member of the center or right trim cover piece are sewn together at bent-back end, forming the second sewn portion 32.

Like the center trim cover pieces 22 and left trim cover piece 24, the right trim cover piece and the center trim cover piece are sewed together, forming the upper trim cover 20Up. The upper trim cover 20Up is positioned on the seat pad 12-1 of the seat cushion and extends to the left and the right along the shape of the seat pad, covering the seat pad (see FIG. 1 and FIG. 2A).

The first sewn portion 31 is formed by sewing the skin members 22*a* and 24*a* and the second wadding members 22*b*-2 and 24*b*-2 below the second wadding members. Each second sewn portion 32 is formed by sewing the skin member 22*a* or 24*a* and the second wadding member 22*b*-2 or 24*b*-2 together, with the first sewn portion clamped between the skin members. The first wadding members 22*b*-1 and 24*b*-1 are not sewn at the first sewn portion 31 or the second sewn portion 32.

Since the skin members and the second wadding member are so sewn as described above, a groove S is provided between the trim cover pieces 22 and 24, having a depth equal to the sum of the thickness of the skin member and the thickness of the first wadding member. The depth of the groove S is equal to the thickness Z of the first wadding member substantially, since the thickness of the skin member is much thinner than the thickness of the first wadding member. The groove S has, for example, a U-shaped cross section. As seen from FIG. 3B, the first sewn portion 31 and the second sewn portions 32 are positioned below the upper surfaces of the trim cover pieces 22 and 24 (i.e., surface of the seat cushion), lying on the bottom of the groove S and spaced from the upper surfaces of the trim cover pieces by the distance approximately equivalent to the thickness of the first wadding member.

The first sewn portion 31 and the second sewn portions 32 are positioned below the upper surfaces of the trim cover pieces 22 and 24, lying on the bottom of the groove S. Therefore, neither the first sewn portion 31 nor the second sewn portions 32 would not hitch or rub even if the seat cushion (more precisely, trim cover piece) warps as the occupant sits or move on the seat. Hence, the sewn portions would not be unraveled or severed. In addition, the second sewn portions 32 are seen through the groove S, from above the trim cover (more precisely, trim cover pieces). The trim cover therefore has a better design effect (decorativeness) than any seat having no sewing decoration. Hence, the trim cover (wadding-up seat trim cover) can have a good outer appearance.

The trim cover pieces 22 and 24 are each composed of a skin member and first and second wadding members only, not requiring any other components. Therefore, the number of the components constituting the trim cover does not increase.

Moreover, since the groove S functions as the air passage at the upper surface of the seat cushion, air conditioning can be performed in the seat cushion even if the occupant keeps sitting on the seat.

The distances X1, X2, Y and Z may be changed, thereby to change the shape of the groove S, more precisely the depth and the length (measured in the left-right direction). This enhances design effect and the freedom of design.

The distance Y, for example, suffices to be long enough to allow the portions 22*af* and 24*af* of the skin members, which do not overlap the first wadding member, to contact the ends 22*b*-1*f* and 24*b*-1*f* of the first wadding members, while pressing the same downwards, and to be bent along the end of the first wadding member. The distance X1 suffices to be long enough to allow the portions 22*af* and 24*af* of the skin members to contact the ends 22*b*-1*f* and 24*b*-1*f* of the first wadding members, while pressing the same downwards, and to be bent along the end of the first wadding members, thereby to form first and second sewn portions 31 and 32.

Similarly, the distance X2 suffices to be long enough to bend the portions 22*b*-2*f* and 24*b*-2*f* of the second wadding members to the back of the trim cover at the first sewn portion 31, thereby to form the second sewn portion 32 at the overlapped portions with the bent-back portions of the second wadding members.

As seen from FIG. 2A, the first wadding member 22b-1 or 24b-1 is thicker than the second wadding member 22b-2 or 24b-2. However, since the first wadding member is thicker than the second wadding member, the groove S is deeper by the thickness of the first wadding member, and prevents unraveling at the first and second sewn portions.

Only in the bonding step of forming the bonded portion 30 and the first and second sewing steps of forming the first and second sewn portions 31 and 32, the groove S is made between the two trim cover pieces, and the first and second sewn portions are formed on the bottom of the groove S. Thus, a simple method having a few steps can manufacture a trim cover (wadding-up seat trim cover) which undergoes neither unraveling nor severing at the first and second sewn portions 31 and 32, and which has a good outer appearance.

FIG. 4A is a magnified sectional view taken along line 2A,4A-2A,4A shown in FIG. 1, showing the seat skin (i.e., trim cover) of the structure of wadded-up seat trim cover, according to another embodiment (Embodiment 2) of the present invention, FIG. 4B to FIG. 4D are sectional views explaining the process of backing a skin member with first and second wadding members prior to the sewing process, and particularly FIG. 4B shows the portions to be bonded together; FIG. 5A is a schematic view illustrating the first sewn portion in the structure of wadded-up seat trim cover, according to the other embodiment (Embodiment 2) of the present invention; and FIG. 5B is a schematic view illustrating the second sewn portions in the structure of wadded-up seat trim cover, according to the other embodiment (Embodiment 2) of the present invention.

Embodiment 2 will be described with reference to FIGS. 4A to 4D and FIGS. 5A and 5B. The components identical to those of Embodiment 1 are indicated by the same reference numbers and will not be described. Only the components characterizing Embodiment 2 will be described in the main.

In Embodiment 1, the skin member is backed with two wadding members (i.e., first and second wadding members). In Embodiment 2, the skin member is backed with one wadding member only.

The center trim cover piece 22 adjacent to the left trim cover piece 24 is composed of a skin member 22a and a wadding member 22b, laid one on the back of the other, from the upper surface (i.e., seat cushion surface) in the order mentioned. Like the center trim cover piece, the left trim cover piece 24 is composed of a skin member 24a and a wadding member 24b, laid one on the back of the other, from the upper surface in the order mentioned.

The wadding member 22b of the center trim cover piece is shorter than the skin member 22a and is positioned below the skin member. A portion 22af of the skin member, which is longer than the wadding member 22b, extends in the widthwise direction (to the left) beyond the end 22bf of the wadding member, and does not overlap the wadding member.

At the position where the skin member 22a of the center trim cover piece 22 overlaps the wadding member 22b, the skin member is bonded to the wadding member at a prescribed distance (i.e., distance Y) from the end 22bf of the wadding member, thereby forming a bonded portion 30.

The portion 22af of the skin member, which does not overlap the wadding member and extends from the end 22bf of the wadding member in a prescribed distance (i.e., distance X1), is bent along the end of the wadding member in the direction of an arrow shown in FIG. 4B. The portion 22af, which is remote from the end of the skin member by a prescribed distance, is a bent-back portion 22af'. Then, the portion 22af of the skin member is bent downward in the direction of the arrow shown in FIG. 4C. Each reference letter 22b' and 24b' in FIG. 4B means a wadding member overlapping the skin member 22 and 24. Two portions 22af of the skin members 22 and 24 of the center and left trim cover pieces are overlapped (see FIG. 4D).

Next, the overlapped portions 22af of the center and left trim cover pieces 22 and 24 are sewn below the wadding member 22b, forming a first sewn portion 31 (see FIG. 5A).

At the first sewn portion 31, the ends of the center and left trim cover pieces 22 and 24 (more precisely, the ends of the skin members 22a and 24a) are bent back to the back of each trim cover. Then, the skin members 22a and 24a of the center and left trim cover pieces are sewn together at the parts overlapped by the bending back (see FIG. 5A), and clamp the first sewn portion 31. Two second sewn portions 32 are thereby formed (see FIG. 5B).

The trim cover pieces 22 and 24 have been sewn together. Therefore, as seen from FIG. 5B, the resultant first and second sewn portions 31 and 32 of the trim cover pieces (i.e., center and left trim cover pieces 22 and 24) are formed at positions below the upper surface (i.e., surface of the seat cushion) by the sum of the thickness of the skin member and the thickness Z of the wadding member. The sum of the thickness of the skin member and the thickness Z of the wadding member is approximately equal to the thickness of the wadding member. As a result, a groove S having depth approximately equal to the thickness Z of the wadding member is provided between the trim cover pieces 22 and 24. The first and second sewn portions 31 and 32 exist on the bottom of the groove S.

Since the first and second sewn portions 31 and 32 exist on the bottom of the groove S positioned below the upper surfaces of the trim cover pieces 22 and 24, the sewn portions would not hitch or rub the occupant as he sits or move on the seat, and the sewn portions would not be unraveled or severed. Further, the second sewn portions 32, which exist on the bottom of the groove S, are seen from the upper surface of the trim cover, the trim cover (wadding-up seat trim cover) can acquire a good outer appearance.

Moreover, the trim cover need not have core members, and the number of components does not increase.

The groove S is provided between two trim cover pieces 22 and 24 in the first and second sewing steps only, and the first and second sewn portions 31 and 32 are positioned on the bottom of the groove. The trim cover (wadding-up seat trim cover) that has sewn portions neither unraveled nor severed and has a good outer appearance can be manufactured by a simple method having a few steps, without using additional components such as core members.

As has been described above, this invention can provide a wadded-up seat trim cover having a good outer appearance and sewn portions neither unraveled nor severed, without increasing the number of components.

Further, this invention can manufacture a wadded-up seat trim cover having a good outer appearance and sewn portions neither unraveled nor severed, made in a simple method having a few steps.

The embodiments have been described to explain this invention, and are not intended to limit the scope of the invention. Accordingly, various changes and modifications may be made within the spirit or scope of this invention, and are of course included in this invention.

Each embodiment of the invention, described above, is a trim cover (wadded-up seat trim cover) for the seat cushion of the vehicle seat. The trim cover can be applied to the trim cover for the seatback or head rest of the vehicle seat. More specifically, the components of a trim cover for covering the seatback or head rest may be bonded and sewn by the method according to this invention, thereby making a groove in the trim cover and decorative sewn portions, lying on the bottom of the groove, neither unraveled nor severed.

INDUSTRIAL APPLICABILITY

This invention is applied to the vehicle seat for use in buses, cars and aircraft. Its use is not limited to the vehicle seat, however. The invention can be applied also to a seat having a wadded-up seat trim cover, such as a seat for use in offices, public halls, theaters, movie houses, sport facility.

REFERENCE MARKS IN THE DRAWING 10 vehicle seat
12 seat cushion
12-1 seat pad
20 trim cover
22,24 center or left trim cover piece of the seat cushion
22a, 24a skin member
22b, 24b wadding member
22b-1, 24b-1 first wadding member
22b-2, 24b-2 second wadding member
30 bonded portion
31 first sewn portion
32 second sewn portion(s)
S groove

What is claimed is:

1. A structure of wadded-up seat trim cover for covering a seat pad, the structure having a plurality of trim cover pieces comprising a first trim cover piece and a second trim cover piece, each of the first and second trim cover pieces having an end and being sewn together at each said end, each of the first and second trim cover pieces composed of a first wadding member, a second wadding member and a skin member backed with the first wadding member and the second wadding member, each of the first wadding member, the second wadding member and the skin member having a length, wherein the length of the first wadding member is less than the length of each of the second wadding member and the skin member, such that a portion of the skin member does not overlap the first wadding member, the structure comprising:
 a first bonded portion comprising the skin member of the first trim cover piece bonded to the first wadding member of the first trim cover piece such that the first wadding member of the first trim cover piece is clamped between the skin member of the first trim cover piece and the second wadding member of the first trim cover piece at a position spaced apart from an end of the first wadding member of the first trim cover piece;
 a second bonded portion comprising the skin member of the second trim cover piece bonded to the first wadding member of the second trim cover piece such that the first wadding member of the second trim cover piece is clamped between the skin member of the second trim cover piece and the second wadding member of the second trim cover piece at a position spaced apart from an end of the first wadding member of the second trim cover piece;
 a first sewn portion comprising a portion of each skin member of the first and second trim cover pieces being bent along the ends of the first wadding members of the first and second trim cover pieces and overlapped by the skin members of the first and second trim cover pieces on the second wadding members of the first and second trim cover pieces, the skin members of the first and second trim cover pieces together with the second wadding members of the first and second trim cover pieces bent downward, and the skin members of the first and second trim cover pieces and the second wadding members of the first and second trim cover pieces sewn together below the first wadding members of the first and second trim cover pieces; and
 a plurality of second sewn portions each comprising ends of the skin members of the first and second trim cover pieces and second wadding members of the first and second trim cover pieces bent to a back of a respective one of the first and second trim cover pieces at the first sewn portion and the ends of the skin members of the first and second trim cover pieces and the second wadding members of the first and second trim cover pieces sewn together at an overlapping portion that clamps the first sewn portion.

2. The structure according to claim 1, wherein each of the first wadding members of the first and second trim cover pieces has a thickness that is greater than a thickness of each of the second wadding members of the first and second trim cover pieces.

3. A method of manufacturing a wadded-up seat trim cover for covering a seat pad, the wadded-up seat trim cover having a plurality of trim cover pieces comprising a first trim cover piece and a second trim cover piece, each of the first and second trim cover pieces having an end and being sewn together at each said end, each of the first and second trim cover pieces composed of a first wadding member, a second wadding member and a skin member backed with the first wadding member and the second wadding member, each of the first wadding member, the second wadding member and the skin member having a length, wherein the length of the first wadding member is less than the length of each of the second wadding member and the skin member, such that a portion of the skin member does not overlap the first wadding member, the method comprising:
 a bonding step of bonding each of the skin members of the first and second trim cover pieces to a respective first wadding member of the first and second trim cover pieces such that each of the respective first wadding members is clamped between the skin members of the first and second trim cover pieces and a respective second wadding member of the first and second trim cover pieces at a position spaced apart from a respective end of the first wadding member of the first and second trim cover pieces, thereby forming a plurality of bonded portions;
 a first sewing step of bending a portion of each of the skin members of the first and second trim cover pieces along a respective end of each of the first wadding members of the first and second trim cover pieces, to overlap on the second wadding members of the first and second trim cover pieces, and then sewing the skin members of the first and second trim cover pieces and the second wadding members of the first and second trim cover pieces below the first wadding members of the first and second trim cover pieces, thereby forming a first sewn portion; and a second sewing step of bending back ends of the skin members of the first and second trim cover pieces and the second wadding members of the first and second trim cover pieces to a back of the first and second trim cover pieces at the first sewn portion and then sewing the ends of the skin members of the first and second trim cover pieces and second wadding members of the first and second trim cover pieces together at an overlapping portion that clamps the first sewn portion, thereby forming a plurality of second sewn portions.

4. The method according to claim 3, wherein each of the first wadding members of the first and second trim cover pieces has a thickness that is greater than a thickness of each of the second wadding members of the first and second trim cover pieces.

* * * * *